Oct. 8, 1968  W. KOHRING  3,404,654
STRUCTURE CAPABLE OF BEING USED AS A MONO-MOORING
Filed Oct. 31, 1967  14 Sheets-Sheet 6

Oct. 8, 1968 W. KOHRING 3,404,654
STRUCTURE CAPABLE OF BEING USED AS A MONO-MOORING
Filed Oct. 31, 1967 14 Sheets-Sheet 7

Fig. 8.

Inventor
Walter Kohring
By
Ken W. Frocks
Attorney

Oct. 8, 1968 W. KOHRING 3,404,654
STRUCTURE CAPABLE OF BEING USED AS A MONO-MOORING
Filed Oct. 31, 1967 14 Sheets-Sheet 8

United States Patent Office 3,404,654
Patented Oct. 8, 1968

3,404,654
STRUCTURE CAPABLE OF BEING USED
AS A MONO-MOORING
Walter Kohring, Garwood Cottage, Church Road,
Rawreth, near Wickford, England
Filed Oct. 31, 1967, Ser. No. 679,421
26 Claims. (Cl. 114—230)

ABSTRACT OF THE DISCLOSURE

The invention provides a mooring structure capable of being used as a mono-mooring and having two relatively rotatable parts which in operation are engaged by an object moored thereto. Weights are attached to the rotatable parts so that relative rotation of the parts lifts the weights to provide a restoring force. The object may be a ship, nudging pontoon or fender for example, movement of which tends to cause relative rotation of the parts so that the object is subjected to the restoring force.

---

This invention relates to a structure capable of being used as a mono-mooring.

Many different types of mono-moorings have been proposed for use in open stretches of water for mooring a single vessel such as a tanker. These include fixed structures supported from the sea bed and buoyant moorings. It is a requirement of mono-moorings that as a result of wind and wave action on the moored vessel it should be able to swing freely through 360° around the mooring and the latter should be equally available for use at any condition of the tide.

A problem with known moorings is to prevent undue snatching of the mooring ropes as the vessel moves about and it has been proposed to utilise fairly long ropes incorporating an extensible section, for example, of nylon. However, this has attendant disadvantages in that with long mooring ropes the vessel tends to yaw as it moves around the mooring. Another difficulty with existing mooring arrangements is that during movement of the vessel around the mooring there may be a tendency for the mooring ropes to slacken and for the vessel to nudge the mooring structure with the consequent risk of damage. Accordingly it is common practice for a vessel moored to a mono-mooring to have its engines running very slowly astern.

It is accordingly a principal object of the present invention to provide an improved rigid structure capable of being used as a mono-mooring which can accommodate surging movements of a vessel moored thereto.

According to one aspect of the present invention there is provided a mooring structure comprising a fixed element, a head connected to the fixed element having first and second parts pivotable relative to one another from a rest position about a vertical axis, at least one weight supported by a plurality of pairs of ropes, the ropes of each pair being respectively connected to the first and second parts so that relative pivoting of the parts from the rest position lifts the weight or weights by increasing the angle between the ropes of each pair to provide an increasing restoring force tending to move the parts back to the rest position.

The fixed element may incorporate an all steel pipe connection to a suitably sized subline so that there is no limit on the loading rates of tenders moored thereto, such limit normally being introduced by the need for flexible hoses of limited diameter.

Various embodiments of the above and other aspects of a mooring structure in accordance with the invention will now be described by way of example with reference to the accompanying drawings in which.

Figure 1:
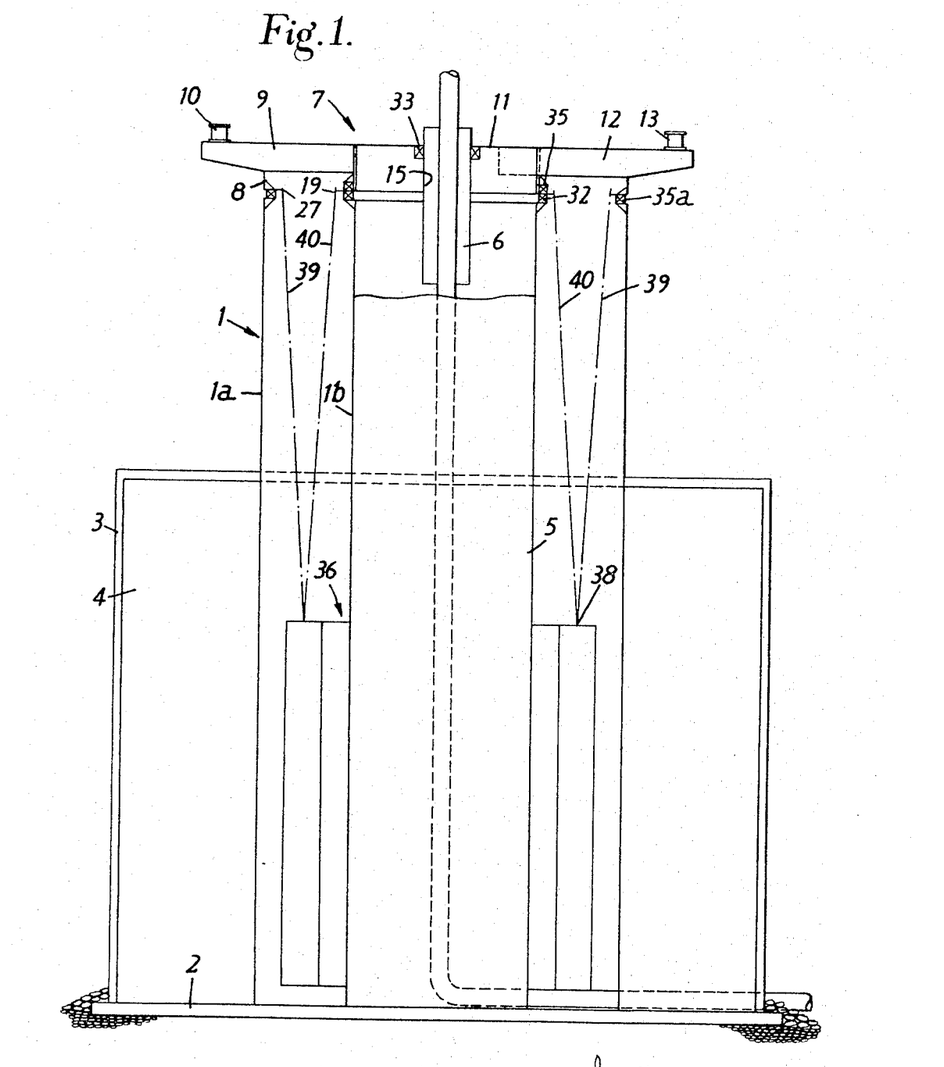
FIGURE 1 shows a vertical section through a mono-mooring with parts of the head pivoted relative to one another to the maximum extent.
Figure 2:
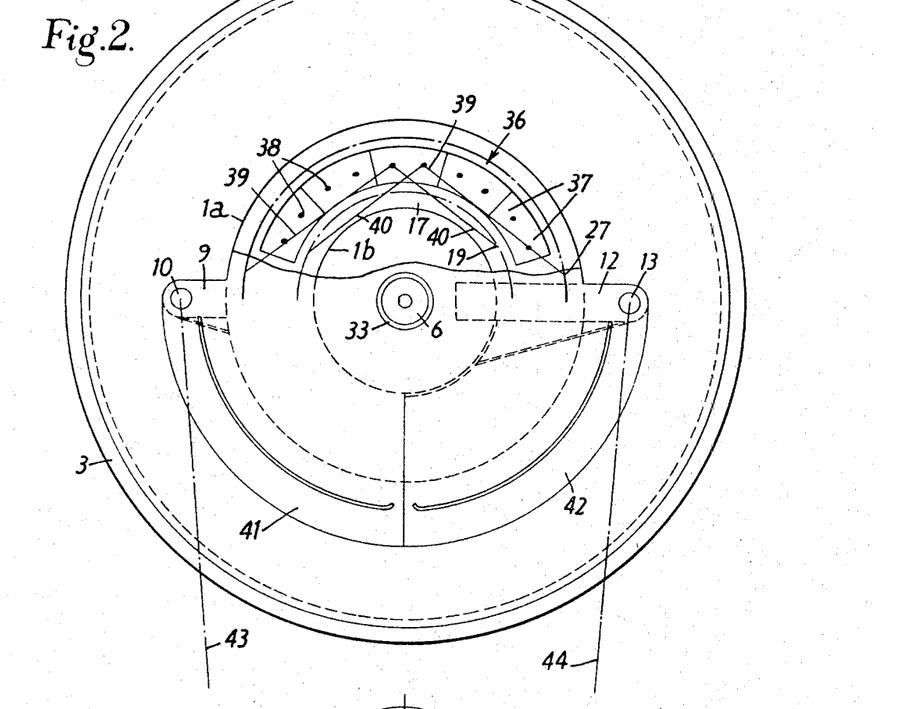
FIGURE 2 is a plan view of the mooring of FIGURE 1.

Referring to FIGURES 1 and 2 of the drawings the mono-mooring comprises a hollow annular casing 1 having outer and inner walls 1a, 1b extending upwardly from a platform 2 on the sea bed and having its lower end surrounded by a compartment 3 provided with concrete or sand filling 4. The central part of the casing 1 is filled with concrete 5, a hollow pillar 6 being embedded in the upper part of the concrete fill 5 to project beyond the upper end of the casing 1.

A rotatable head indicated generally at 7 is disposed at the upper part of the mooring and comprises a first part 8 provided with a radially outwardly projecting bollard arm 9 carrying a bollard 10 at its outer end. The head also comprises a second part 11 to which a radially outwardly extending removable bollard arm 12 carrying a bollard 13 is secured. The constructions of the two parts 8 and 11 are most clearly shown in FIGURE 5 of the drawings from which it will be seen that the part 11 comprises a boss 14 formed with a central aperture 15 which is a clearance fit over a pillar 6. An aperture plate 16 extends across the lower part of the boss and projects outwardly beyond the periphery thereof to constitute upper and lower annular tracks 17 and 18 the outer edges of the tracks being defined by a rim 19. The bollard arm 12 is secured to the boss by means (not shown) to permit the part 8 to be assembled over the part 11 as will be described hereinafter.

Figure 5:
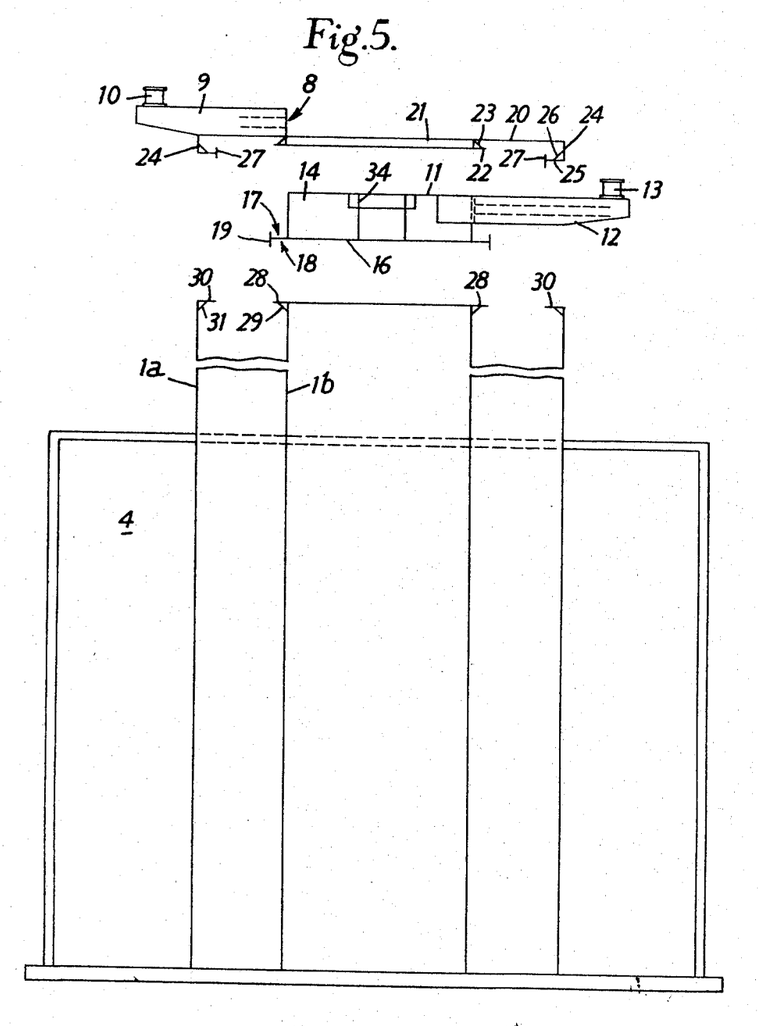
FIGURE 5 is an expanded view of the head parts of FIGURE 1.

The part 8 comprises an annular ring 20 formed with a central aperture bounded by a downwardly extending wall 21 the lower end of which carries an outwardly extending ring 22 the lower surface of which constitutes a track, and to the upper surface of which a multiplicity of radially spaced reinforcing members 23 are secured. The outer edge of the ring 20 has a downwardly extending skirt 24 formed with an inwardly projecting ring 25 the lower surface of which constitutes a track and to the upper surface of which a multiplicity of radially spaced reinforcing members 26 are secured the boundary of the ring 25 being defined in a rim 27.

A multiplicity of radially spaced members in a ring 28 extend outwardly around the upper end of the inner wall 1b of the casing and are supported therefrom by reinforcing members 29 and a corresponding ring of members 30 extend inwardly from the upper end of the outer wall 1a of the casing and are supported therefrom by reinforcing members 31. In assembling the head on the mooring the second part 11 without the bollard arm 12 is first disposed over the pillar 6 to be rotatable on bearings 32 acting between the upper surface of the ring of members 28 and the track 18, thrust bearings 33 being disposed in a recess 34 of the boss 14 to act between the latter and the upper end of the pillar 6. The part 8 is then disposed over the part 11 to rest upon inner bearings 32 acting between the track 17 and the track constituted by the lower surface of the ring 22 and outer bearings 35a acting between the upper surface of the ring of members 30 and the track constituted by the lower surface of the ring 25. After location of the parts as described above, the bollard arm 12 is secured to the boss 14 to provide the assembly shown in FIGURES 1 and 2 of the drawings.

As shown in FIGURES 1 and 2 a cylindrical weight structure indicated generally at 36 is disposed with clearance in the lower part of the annular casing and is made up of a plurality of individual weights 37 which in horizontal section are part wedge-shaped. Each of the weights has a single anchorage point 38 centrally of its upper end and two ropes such as 39 and 40 are secured at their lower ends to this anchorage point and respectively at their upper ends to the rim 19 of the part 11 of the head 7 and the rim 27 of the part 8 of the head 7.

Figure 4:
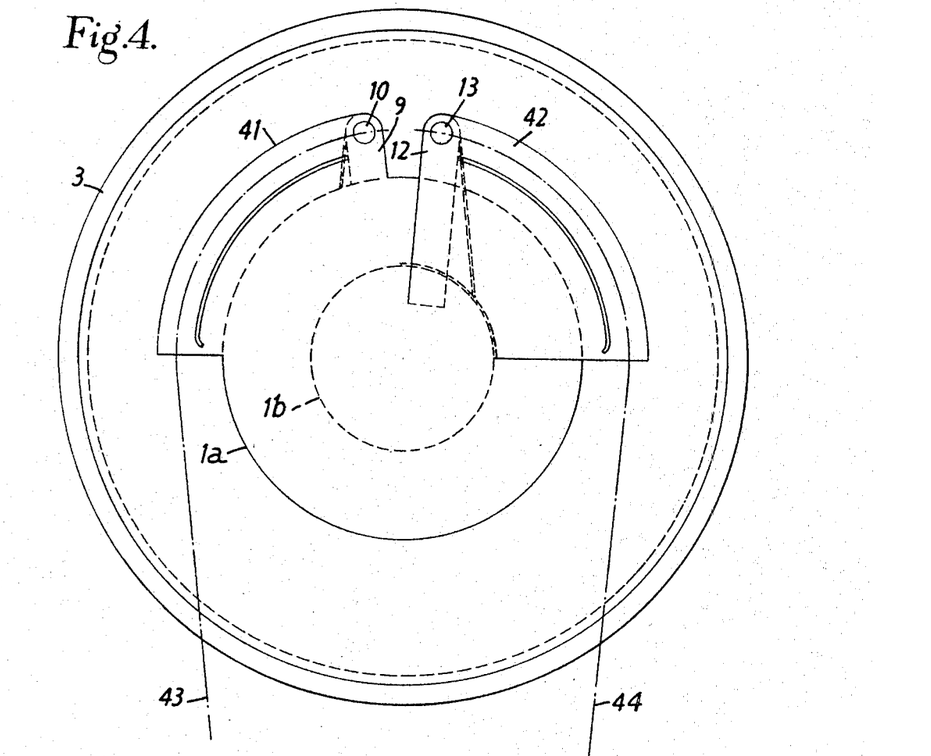
FIGURE 4 is a simplified plan view of the mooring with the head parts in their rest position.

In FIGURE 1 the weight structure 36 is shown in its lowermost position which in fact corresponds to the position of the parts of the head 7 as shown in FIGURE 4 and not as shown in FIGURES 1 and 2. In the latter figures these parts have been displaced with respect to one another to their maximum extent.

When the weights are in the lowermost position and the parts 8 and 11 of the head 7 are in their rest position (FIGURE 4) each pair of ropes 39 and 40 secured to an anchorage point 38 extends upwardly in a common radial plane and as the parts 8 and 11 are pivoted relative to one another towards the position shown most clearly in FIGURE 2 the angle between each pair of ropes 39 and 40 is increased so that the weight structure 36 is lifted and an increasing restoring force is applied to the parts 8 and 11 which tends to move them back to their rest positions. During displacement of the parts of the head there will be a tendency for each of the individual weights 37 to move radially inwardly but since the structure 36 is a symmetrical annular formation and each weight is part wedge-shaped in horizontal section this tendency is balanced out and the structure 36 is free to move only in a vertical direction.

As shown in FIGURES 2 and 4 the parts 8 and 11 respectively carry quadrant-shaped mooring rope guides 41 and 42 which ensure that mooring ropes such as 43 and 44 respectively secured to the bollards 10 and 13 apply leverage thereto proportional to the tensions therein. It will be assumed that the mooring ropes 43 and 44 are secured to the bows of a ship and it will be understood that as a result of any change in wind and tide action the entire head structure 7 may bodily rotate to permit the ship to swing freely around the mono-mooring in either direction and that should the ship tend to surge away from the mooring so as to suddenly increase the tension in the mooring ropes 43 and 44 the parts 8 and 11 will be moved from their rest position as shown in FIGURE 4 towards their position of maximum displacement as shown in FIGURE 2 so that lifting of the weight structure 36 will provide a restoring force to counteract the surge.

Figure 3:
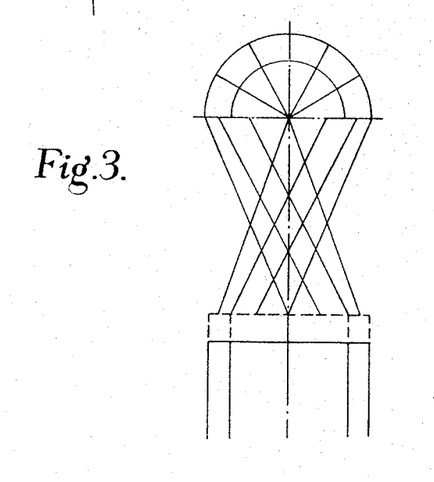
FIGURE 3 is a diagrammatic representation of the manner in which weight supporting ropes are twisted during rotation of the head parts.

FIGURE 3 of the drawings shows diagrammatically the pattern into which the pairs of ropes 39 and 40 are twisted upon displacement of the parts 8 and 11 from their rest positions and it will be apparent that the greater the angle between the ropes of each pair (i.e. the higher the weight structure is lifted) the greater will be the restoring force tending to move these parts back to their rest positions.

Figure 6:
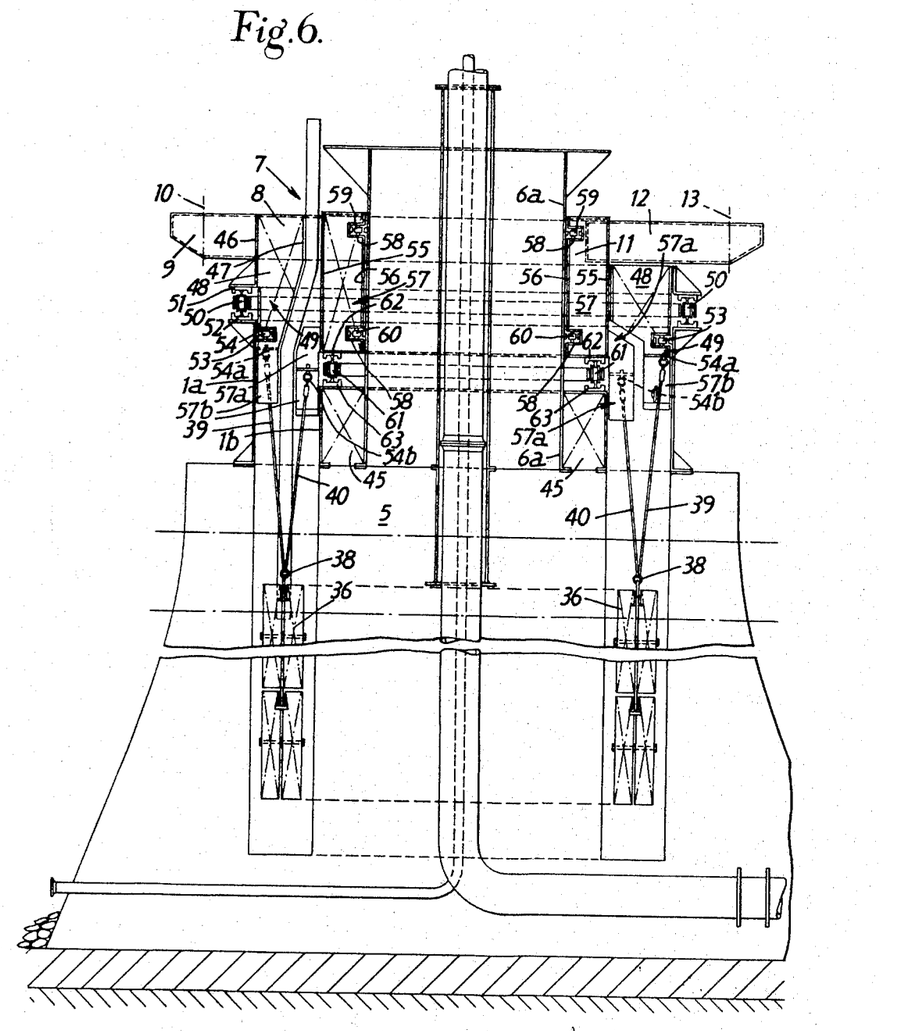
FIGURE 6 is a sectional elevational view to a larger scale of a modified construction of head parts.

FIGURE 6 of the drawings shows a modified arrangement of the head 7 and the upper part of the mooring, which provides a particularly strong structure with improved lateral supports for the parts 8 and 11 during pivotal movement thereof. As shown in FIGURE 6 the upper parts of the casing walls 1a and 1b are extended upwardly beyond the concrete fill 5 within the inner part of the casing and the pillar 6 is replaced by a central pillar 6a of larger diameter to accommodate a pipe line and if desired support a platform above sea level, the pillar extending upwardly centrally from the upper surface of the fill 5 and being joined to the casing part 1b by a multiplicity of radially extending diaphragm plates 45.

The head part 8 comprises an outer annular wall 46 and a concentric inner annular wall 47 joined together by a multiplicity of radially extending diaphragm plates 48 which extend downwardly at 49 below the walls 46 and 47 to within the space between the casing extensions 1a and 1b. Roller bearings 50 are disposed to act between annular tracks 51 and 52 respectively carried by the wall 46 and the casing extension 1a each of the bearings 50 being disposed in radial register with a diaphragm plate 48 and being retained in such position by inner and outer rings. Lateral thrust of the part 8 is accommodated by a similar number of roller bearings 53 rotatably mounted in slots 54 in the outward extensions 49 to bear against the upper end of the inner surface of the casing extension 1a. As shown in FIGURE 6 it is convenient that the lower edges of extensions 49 should be used as anchoring points 54a for the ropes 39 and to this end there must be as many diaphragm plates 48 as weights.

The head part 11 comprises an outer annular wall 55 of a diameter to be an adequate clearance within the inner wall 47 of the part 8 and a concentric annular inner wall 56 of a diameter to have an adequate clearance over the pillar 6a these walls being joined by a multiplicity of radially extending diaphragm plates 57 each of which is formed with a pair of spaced-apart slots 58 registering with suitable apertures in the wall 56 to receive a series of upper and lower rollers respectively indicated at 59 and 60 which bear against the outer surface of the pillar 6a. The part 11 is supported axially of the mooring by a series of roller bearings 61 acting between annular tracks 62 and 63 respectively carried by the wall 55 and the casing part 1b. The ropes 40 are secured to anchorage points 54b on respective extensions 57a of the diaphram plates 57.

As shown at the right-hand side of FIGURE 6 the height of the casing part 8 is reduced to accommodate the bollard arm 12 this reduction in height extending through an arc of approximately 120° to permit appropriate relative pivotal movement between the parts 8 and 11.

Figure 7:
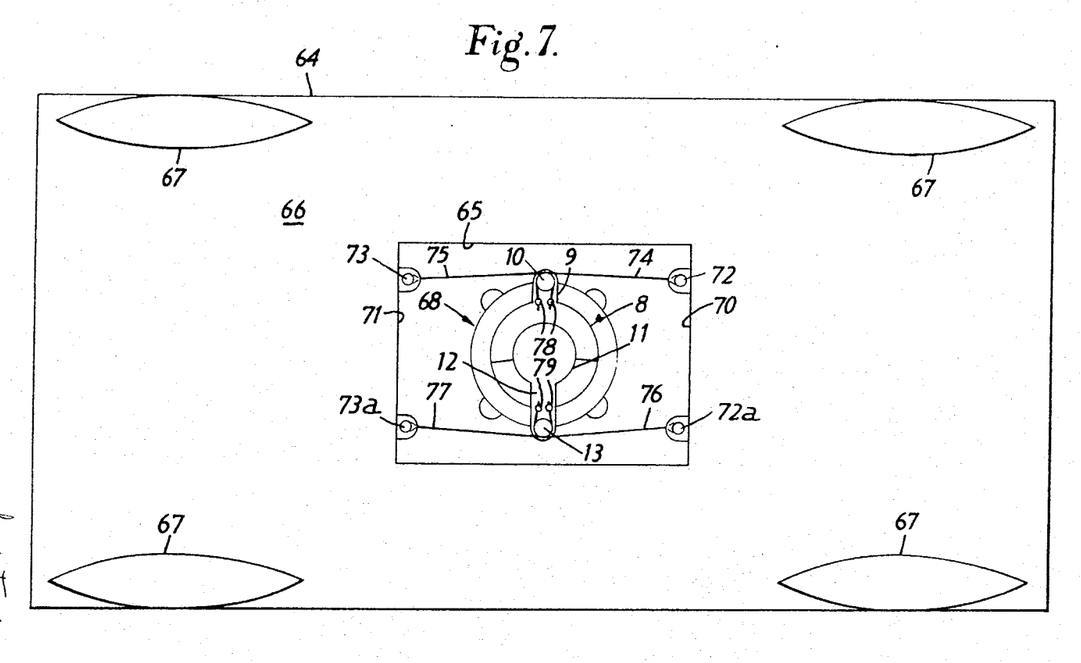
FIGURE 7 is a diagrammatic plan view of a modified mono-mooring arranged as an anchor for a variable buoyancy tank structure.
Figure 8:
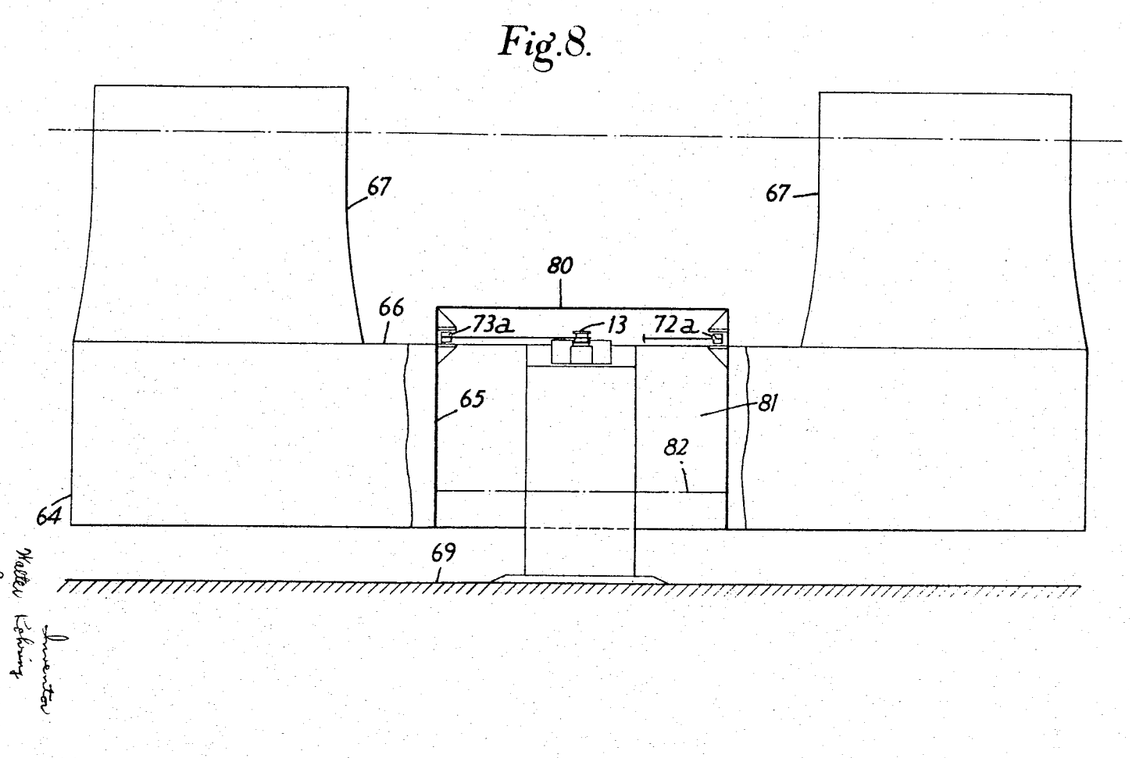
FIGURE 8 is an elevational view of the structure of FIGURE 7.

FIGURES 7 and 8 of the drawings show respectively diagrammatic plan and cut-away side elevational views of the way in which a mono-mooring may be utilised to anchor an open-bottomed variable buoyancy liquid storage tank for location beneath the surface of a tract of water. As shown in these figures the tank 64 is in the form of a rectangular annulus in plan view having a central rectangular opening 65 the walls of which extend from the bottom of the tank to a position above the top 66 thereof. Four buoyancy chambers 67 which as shown in FIGURE 7 are torpedo shaped in plan view are mounted one at each corner on the upper surface 66 to extend upwardly away therefrom the chambers being similarly oriented so that their longitudinal axes are parallel with the longitudinal axis of the tank. It will be understood that although not shown in the drawings the buoyancy chambers may be provided with separate or communal means for pumping sea water into and out of them in order to vary the buoyancy of the tank structure.

A mono-mooring indicated at 68 is suitably located on the sea bed 69. This mono-mooring is generally in accordance with the construction shown in FIGURES 1 to 5 of the drawings or in accordance with FIGURE 6 except that the two head parts 8 and 11 are arranged so that their respective bollard arms 9 and 12 and bollards 10 and 13 are disposed diametrally opposite one another in their rest positions. The tank 64 is disposed over the mono-mooring so that the diametral line joining the bollards 10 and 13 extends transversely of the longitudinal axis of the tank and the latter is maintained at the required depth in known manner by varying the buoyancy of the chambers 66. Each of the end walls 70 and 71 of the opening 65 carry pairs of anchorage points 72, 72a, and 73, 73a. The anchorages 72 and 73 are respectively connected to the bollard 10 by the ropes 74 and 75 and the anchorages 72a and 73a are respectively connected to the bollard 13 by ropes 76 and 77. Each of the ropes is formed with a loop at its outer end embracing its associated anchorage on the end walls of the aperture 65 and the inner ends of the ropes are given a turn around their associated bollard and anchored as at 78 or 79 to the bollard arms.

It will be understood that with the arrangement above described the shape of the buoyancy chamber 67 enables the tank structure to rotate around the mono-mooring 68 without relative displacement of the parts 8 and 11 so that it is continuously in line with the dominant direction of wind and wave action. Thus, any surges which occur tending to cause sudden violent movement of the tank structure will be directed against one or other end of the tank to move the latter longitudinally. It will be appreciated that when this occurs relative angular displacement of the parts 8 and 11 in either direction will produce within the mono-mooring 68 an ever increasing restoring force to counteract the tank movement. As shown in FIGURE 8 the upper end of the aperture 65 is closed by a capping 80 and it is intended that the inverted chamber thus formed shall be filled with oil 81 and oil/water interface 82 occurring towards the bottom of the chamber. Thus, all the operative parts of the mono-mooring may be permanently maintained in an oil bath.

Figure 9:
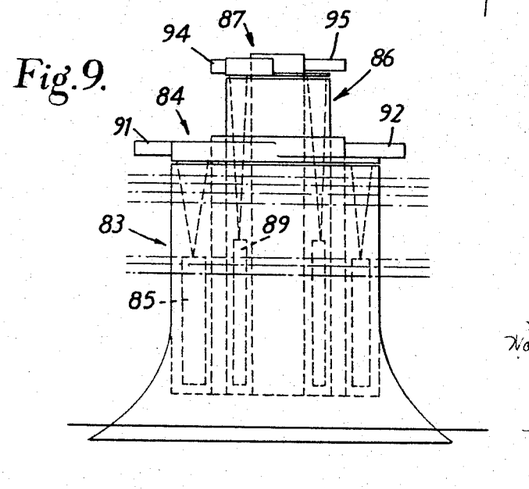
FIGURE 9 is a diagrammatic representation of a further modification of a mono-mooring incorporating two surge control heads.

FIGURE 9 of the drawing shows diagrammatically in side elevation a modified construction in which, in effect, two mono-moorings are arranged concentrically the outer one 83 having a lower surge control head 84 coupled with an outer weight structure 85 and the inner one 86 having an upper surge control head 87 of smaller diameter than the head 84 and coupled with an inner weight structure 89. One use of the mooring of FIGURE 9 is shown in FIGURES 10 and 11 in which a nudging pontoon indicated generally at 90 is disposed to act between the bollard arms 91 and 92 of the lower head 84 and the bows 93 of a ship moored to the arms 94 and 95 of the upper head so that the mooring can accommodate surging movements of the ship in a direction towards the mooring as well as in a direction away from the mooring.

Figure 11:
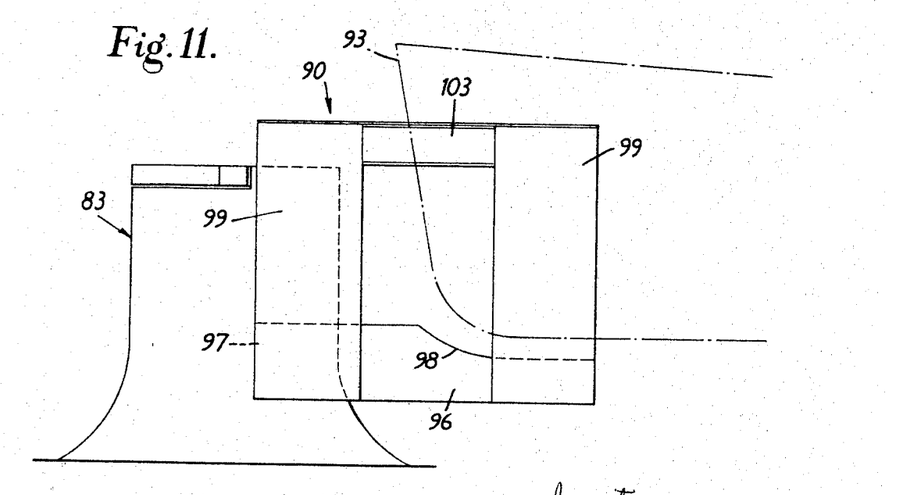
FIGURE 11 is a side elevational view of the arrangement of FIGURE 10, FIGURES 12, 13 and 14 show different diagrammatic views of a pair of mooring structures arranged as a dock-side fender, FIGURES 15 and 16 respectively show another mooring structure used as a dock-side fender.

The nudging pontoon 90 comprises lower bunker tanks 96 which are of generally rectangular shape in plan view with their forward edges 97 cut away to embrace with adequate clearance the mono-mooring 83 the upper surface of the tanks 96 as shown at 98 in FIGURE 11 being cut away to the rear of the nudging pontoon. Similarly oriented buoyancy chambers 99 which are torpedo shape in plan are disposed to extend upwardly from the corners of the bunker tanks 96 and the upper ends of these buoyancy chambers are joined by a deck 100 the forward end 101 of which is shaped to clear the mooring 83 and the rearward end of which is formed with a sharply pointed recess 102 having concavely curved walls. The deck is reinforced by a girder structure, part of which is indicated at 103 and in addition the walls of the recess 102 are provided with buffers (not shown) against which the bows 93 of a ship may nudge.

Figure 10:
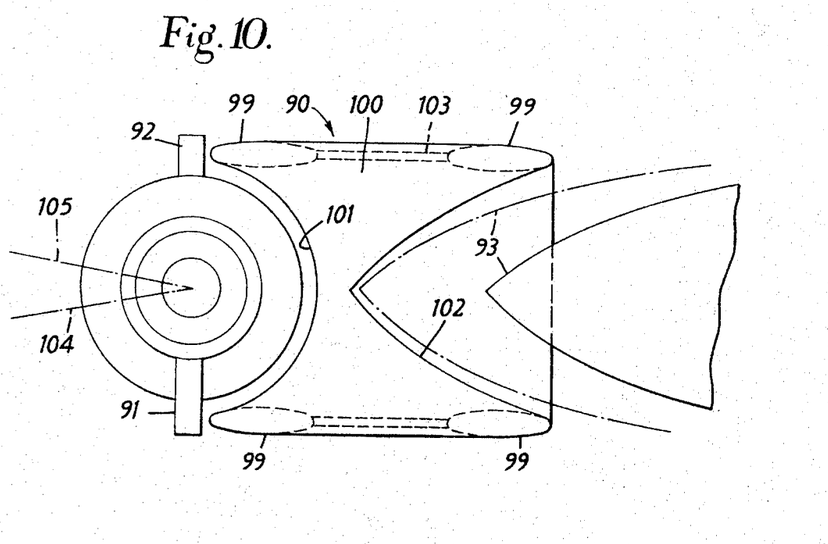
FIGURE 10 is a diagrammatic representation of the mooring of FIGURE 9 in plan in conjunction with a nudging pontoon fender for mooring a ship.

In operation the nudging pontoon 90 is located as shown in the drawings so that its forward end embraces the mono-mooring and it is moored by means (not shown) to the arms 91 and 92 of the lower head 84 these arms being diametrally opposed in their rest position as shown in FIGURE 10. The ship is moored to the arms 94 and 95 of the upper head 87 and it is to be noted that in their rest positions these arms will lie on the lines 104 and 105 (FIGURE 10) and not in diametrally opposed positions as indicated for clarity in FIGURE 9. The ship is moored sufficiently closely to the mono-mooring that its bows 93 extend within the recess 102 the full line position of the bows 93 representing a situation when the ship is under full sea force and the arms 94 and 95 of the upper head 97 are displaced from their rest positions to the maximum extent and the chain line position of the bows 93 representing an opposite condition when the ship is tending to move towards the mono-mooring and is about to push the nudging pontoon 90 towards the mono-mooring so that the arms 91 and 92 of the lower head 84 are deflected away from the ship to provide a restoring force tending to restrain the ship from further movement towards the mono-mooring.

Figure 12:
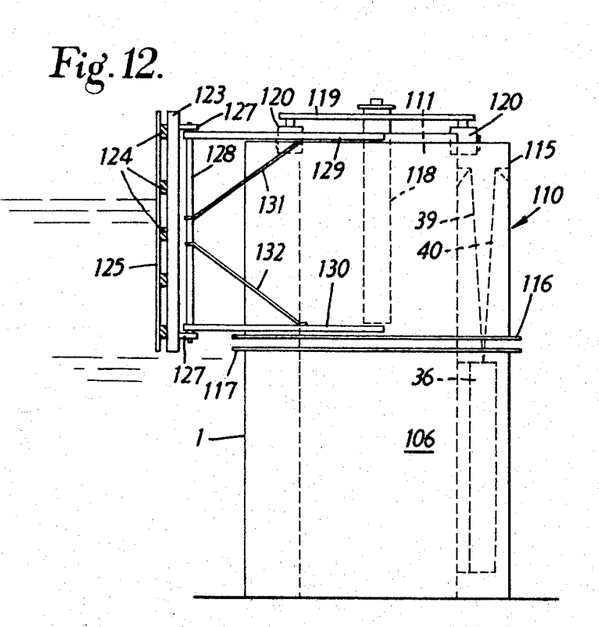
Figure 13:
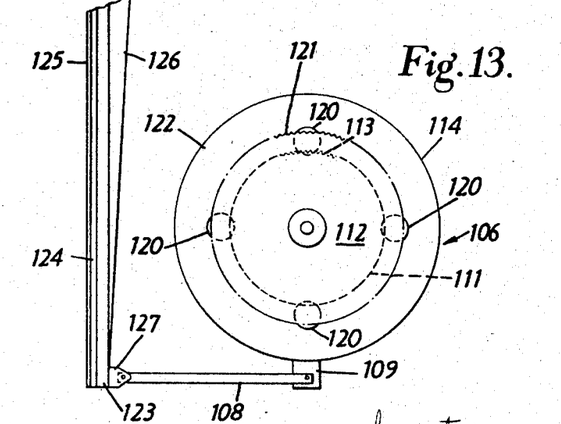
Figure 14:
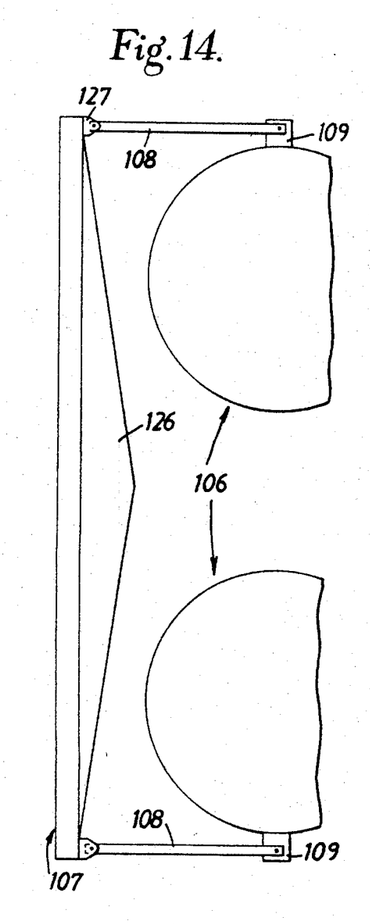

FIGURES 12, 13 and 14 show an arrangement in which a pair of modified mono-moorings in accordance with the invention are utilised to support a dock-side fender to provide the latter with surge control. In this arrangement, as shown in FIGURE 14, two mono-mooring units 106 are arranged in spaced apart relationship and a fender unit 107 is coupled by pivoted arm members 108 with brackets such as 109 respectively to the mono-mooring 106.

As shown more clearly in FIGURES 12 and 13 each of the mono-moorings 106 comprises an axially extended surge control head 110, the part 111 of which corresponds with the part 11 of the head 7 of FIGURE 1, and includes an upper plate 112 which is peripherally toothed as at 113. The head also has an outer part 114 corresponding with the part 8 of the head 7 of FIGURE 1 and which is extended downwardly to provide an annular skirt 115 having an outwardly directed flange 116 at its lower end registering with a flange 117 at the upper end of the casing 1 of the mono-mooring. A pillar 118 is mounted centrally of head 7 to extend above the part 111 and carries at its upper end a freely rotatable planet carrier 119 which in turn supports four rotatable planet wheels 120 acting between the teeth 113 on the plate 112 and corresponding teeth 121 formed on the inner periphery of an inwardly turned flange 122 of the outer part 114. Thus the plate 112 constitutes the sun wheel and the part 114 constitutes the outer annulus of a planetary gear system. The weight structure 36 is supported by ropes 39 and 40 respectively secured to the inner part 111 and the outer part 114 towards the upper ends of the latter. It will be understood that with this arrangement suitable bearings (not shown) are provided to act between the skirt 115 and the casing 1.

The fender unit 107 comprises a main frame 123 faced by whaling 124 and a rubbing face 125. The unit is backed by a number of centrally thickened supports one of which is shown at 124. At each of its ends the unit has a pair of rearwardly extending vertically spaced brackets 127 supporting a pivot shaft 128 on which the arm members 108 are respectively mounted. The arm members comprise upper and lower arms 129 and 130 and supports 131 and 132 and the inner ends of the arms are pivotally connected to outwardly projecting brackets such as those shown at 109 in FIGURES 13 and 14.

In operation it will be understood that pressure on any part of the fender unit 107 will cause movement of one or both ends thereof towards the mono-moorings 106 so that one or both of the outer parts 114 of their surge control heads will be rotated; the planetary gearing causing corresponding centra-rotation of the inner parts of the heads so as to lift the weight structures such as 36 and provide a restoring force.

Figure 15:
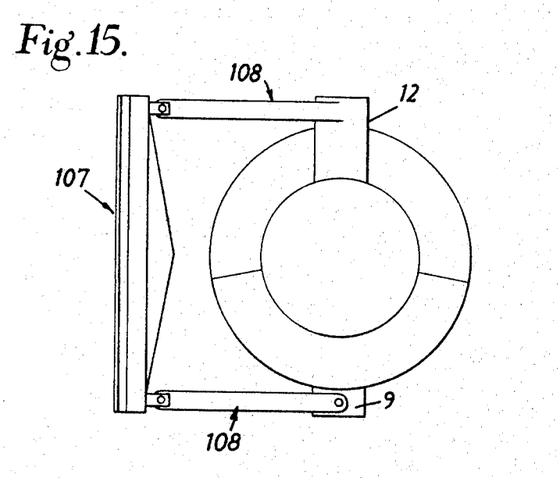
Figure 16:
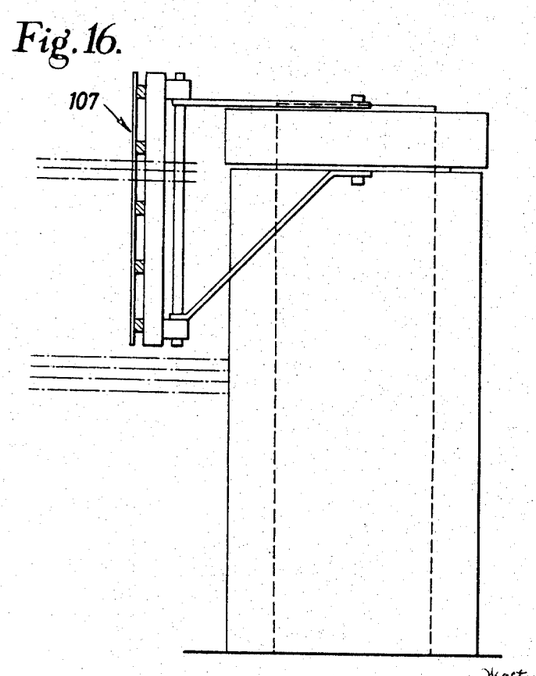

FIGURES 15 and 16 show another arrangement in which a generally similar fender unit 107 has its arm members 108 connected to bollard arms 9 and 12 of a mono-mooring generally constructed in accordance with the arrangement of FIGURES 1 to 5.

Figure 17:
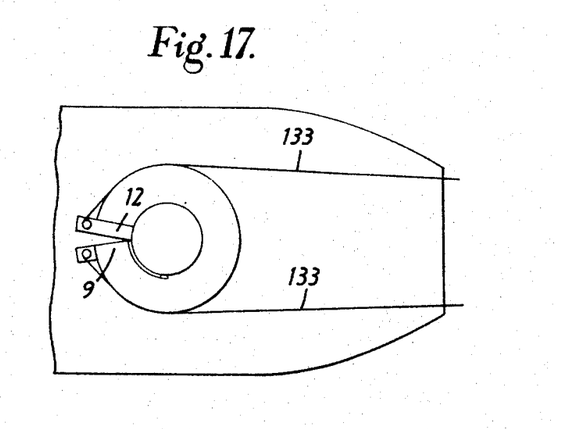
FIGURES 17 and 18 show respectively plan and side elevational views of a mooring structure used on board ship for surge control during towing.
Figure 18:
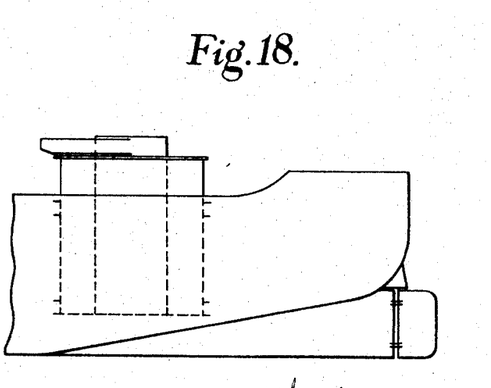

FIGURES 17 and 18 show another arrangement in which a mono-mooring according to FIGURES 1 to 5 or FIGURE 6 is mounted in the stern of a tug or other towing vessel and so oriented with respect to the vessel that the arms 9 and 12 in their rest positions are directed generally towards the bows of the vessel. Ropes 133 connected with the bollards carried by these arms pass over the stern of the vessel to be secured to a vessel or object being towed. In this arrangement it will be understood that any snatching which occurs in these ropes can be accommodated by the mono-mooring.

Figure 19:
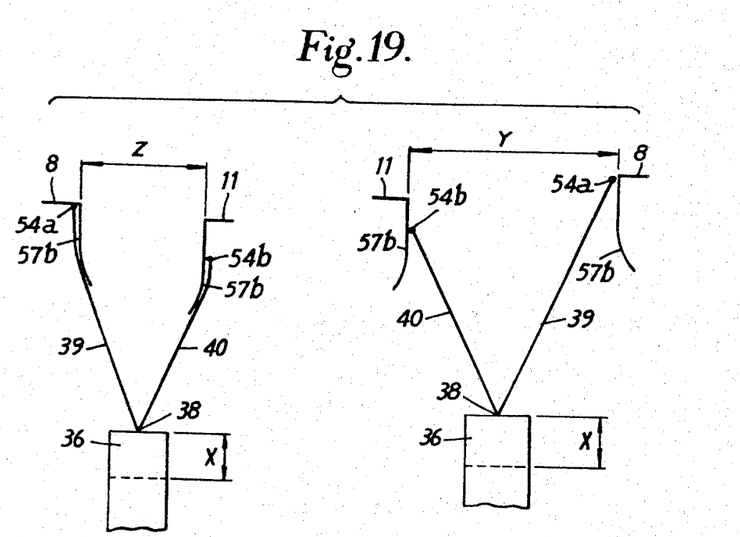
FIGURE 19 shows diagrammatically a modification applied to the structure of FIGURE 6.

FIGURE 19 shows diagrammatically a modification of FIGURE 6 in which the plates 49 and 47a have been extended downwardly below the anchorage points 54a and 54b to form shaped cheeks 57b. These cheeks are so curved that when the rotatable rings are rotated relative to one another in one direction as shown in the right-hand half of FIGURE 19 the cheeks do not interfere with the free hanging of the ropes 39 and 40 and the weights are lifted through the distance X for a relative pressure of the rings corresponding to the distance Y. However, when the rotatable rings are relatively rotated in the opposite direction as shown in the left-hand half of FIGURE 19 the cheeks 57b engage the ropes 39 and 40 and effectively shorten the length of the ropes between the anchorage points so as to increase the relative angle between the ropes. The weights will then rise the distance X for the relative travel between the parts corresponding to the distance X. It will be appreciated that by this arrangement the restoring force for a particular angle of relative rotation is greater in one direction than in the other direction. In a modification of this system similar cheeks could be arranged on the weights with two anchorage points 38 replacing the single anchorage point.

Figure 20:
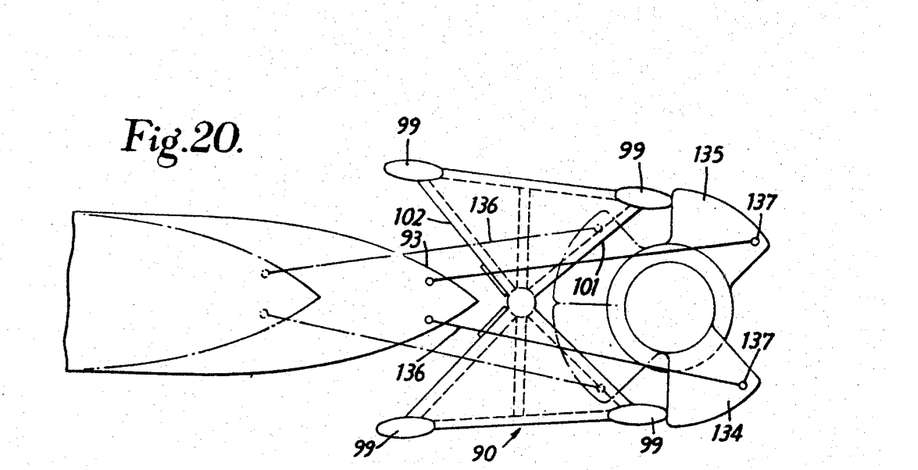
FIGURE 20 shows a further combination of mooring structure and nudging pontoon.

The modified structure shown in FIGURE 19 is particularly applicable to the arrangement of a nudging pontoon and mono-mooring as shown in FIGURE 20. In this case the nudging pontoon 90 is similar to that shown in FIGURE 10 and will not be re-described. In this case the mono-mooring has only a single head with two arms 134, 135 attached to the relative rotatable parts and as shown in the rest position having their axes separated by an angle of 120° on the opposite side of the mooring from the nudging pontoon. The arms are so shaped that they are engageable in the rests position by the nudging pontoon in a plane normal to the axis of the ship. The nudging pontoon thus acts against the arms to push them towards one another on the opposite side of the mooring from the pontoon, the arms being movable until they practically engage one another. Mooring ropes 136 from the ship are attached to the same arms at 137 so that movement of the ship away from the mooring tends to pull the arms towards one another on the side of the mooring adjacent the pontoon. Where the mooring is modified according to FIGURE 19 the smaller allowable rotation caused by pushing by the pontoon is arranged to exert the same restoring force as the larger rotation allowable on pulling of the ship away from the mooring.

Figure 21:
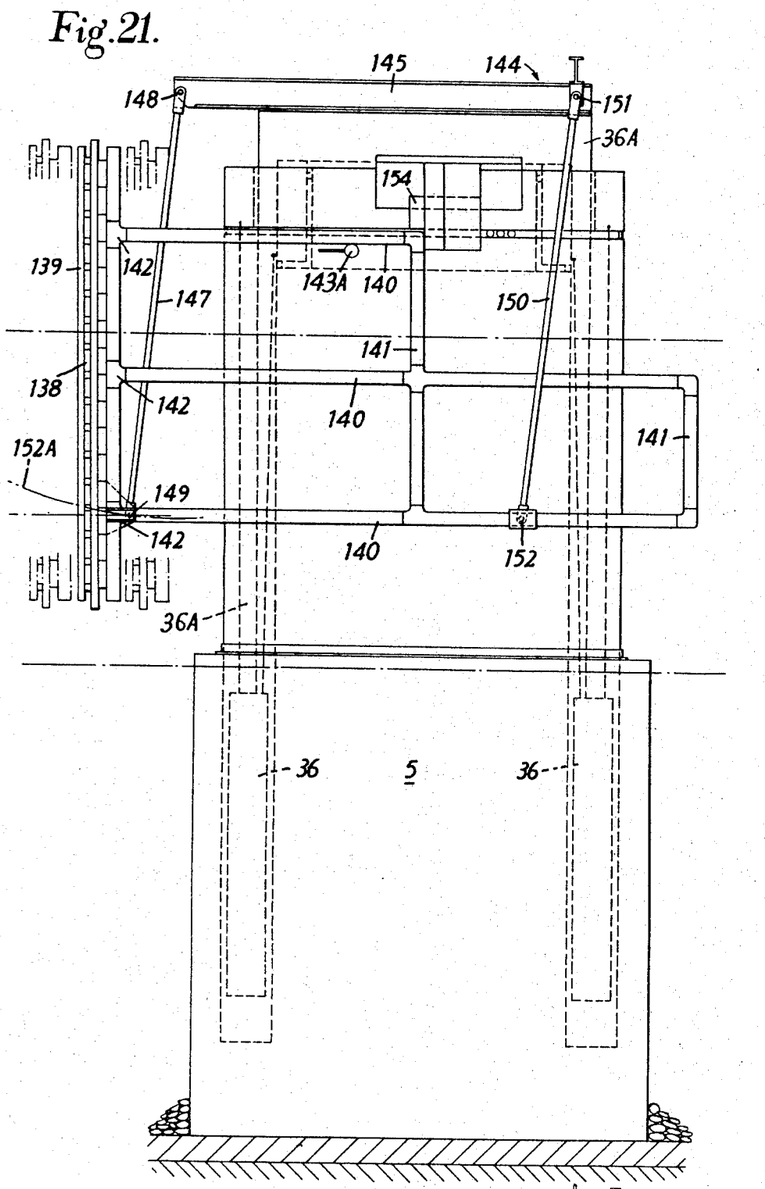
FIGURES 21 and 22 show respectively side and plan views of a further combination of mooring structure and keyside fender.
Figure 22:
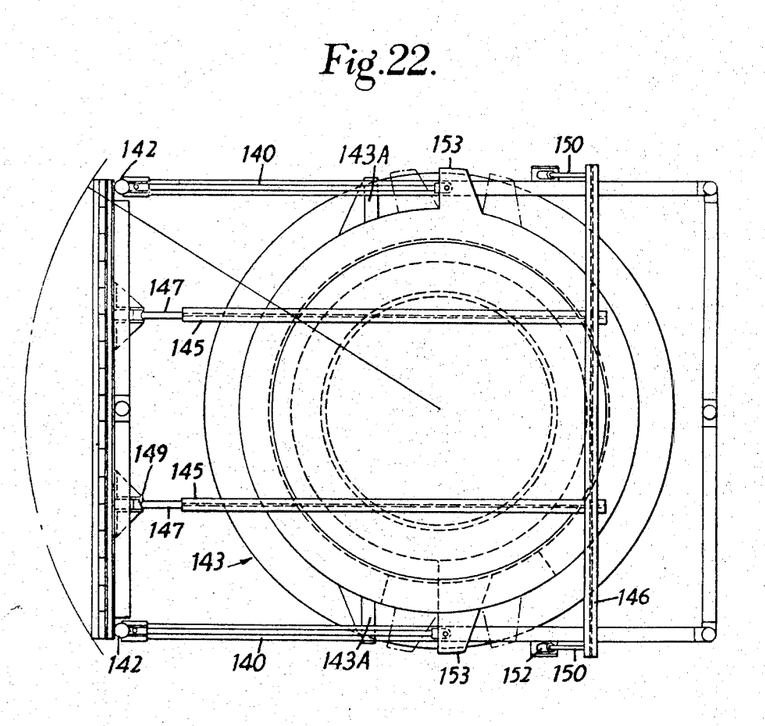

A further embodiment of mono-mooring in combination with a dock-side fender is shown in FIGURES 21 and 22. Again the mooring is of the form shown in FIGURES 1 to 5 or FIGURE 6 and will not be re-described. The fender is shown at 138 having an outer vertical fender surface 139; a framework of horizontal tubes 140 and vertical tubes 141 is secured to the fender at 142 at each side of the fender to embrace the mooring 143. Tubes 140 are slidably supported on brackets 143A on the mooring. Supported on an upper cylindrical extension 36A of the weights 36 is a further overhead framework 144 formed by two beams 145 parallel to the tubes 140 and a cross beam 146 secured thereto. A pair of forward links 147 have their upper ends pivotally attached to the front ends of the beams 145 at 148 and their lower ends pivotally attached to the fender at 149. A further pair of links 150 parallel to the links 147 have their upper ends pivotally secured at 151 to the upper ends of beam 146 and their lower ends pivotally secured at 152 to the lower tubes 140.

The links 147 and 150 thus form a parallel linkage connecting the arms carried by the fender and carried by the vertical extension 36A of the weights. At 152A is shown in broken outline the arc which would be travelled through by the fender if the upper frame 144 were fixed. However, because the frame 144 moves upwards on upward movement of the vertical extension of the weights the fender will in fact move horizontally. The arms 153 connected to the rotatable parts of the fender make an angle of substantially 180° with one another in the mid position and are engaged at 154 by the upward extension of the vertical tubes 141. The operation is as previously described. Thus inward movement of the fender causes the rotatable parts to rotate relative to one another thus lifting the weights and providing a restoring force. The horizontal movement of the fender prevents rubbing which would occur against the ship if the fender moved in an arc.

I claim:

1. A mooring structure comprising a fixed element, a head connected to the fixed element and having first and second parts rotatable relative to one another from a rest position about a vertical axis, at least one weight supported by a plurality of pairs of ropes, the ropes of each pair being respectively connected to the first and second parts so that relative pivoting of the parts from the rest position lifts the weight by increasing the angle between the ropes of each pair to provide an increasing restoring force tending to move the parts back to the rest position.

2. A mooring structure according to claim 1 in which the first and second parts mounted for rotation together about said axis in either direction and for rotation relative to one another in either direction about said axis.

3. A mooring structure according to claim 1 in which in the rest position the ropes of each pair are in substantially the same radial plane.

4. A mooring structure according to claim 1 in which each of the first and second parts comprises a ring like structure rotatably mounted on the fixed element.

5. A mooring structure according to claim 4 in which the first and second parts are in the form of an inner ring and an outer ring.

6. A mooring structure according to claim 1 in which the fixed element includes a hollow annular casing and a plurality of the weights are located in the casing.

7. A mooring structure according to claim 1 in which the fixed element includes a central hollow pillar which extends within and above the first and second parts, and a rigid pipe extending within the pillar and at its lower end for connection to an underwater pipeline.

8. A mooring structure according to claim 1 including roller bearings acting between annular tracks on the fixed element and on the rotatable first and second parts.

9. A mooring structure according to claim 1, in which each of the first and second rotatable parts has a substantially radially outwardly extending arm, the arms being arranged to receive the applied force from the object moored to the mooring.

10. A mooring structure according to claim 9 in which the arms are at the same height.

11. A mooring structure according to claim 9 in which the arms are separated by an acute angle in the rest position.

12. A mooring structure according to claim 1, in which the weight is in the form of an annular cylinder.

13. A mooring structure according to claim 12 in which there are a plurality of weights each in the form of a wedge, the weights engaging one another to form an annulus.

14. A mooring structure according to claim 1, in which the ropes are attached to the rotatable first and second parts and to the weights at attachment points and guide cheeks adjacent at least some of the attachment points, the cheeks being shaped to engage with the ropes so that for any angle of relative rotation of the parts, relative rotation in one direction increases the angle between the ropes through a greater amount than relative rotation in the other direction.

15. A mooring structure according to claim 1, including mooring rope guides shaped to ensure that mooring ropes from the object to be moored apply leverage to the rotatable parts according to the tension therein.

16. A mooring structure comprising a fixed element; a pair of rotatable heads mounted on the element; each head having first and second rotatable parts rotatable relative pivoting of the parts from the rest position lifts cal axis, and a plurality of weights supported by a plurality of pairs of ropes, the ropes of each pair being connected to the respective first and second parts so that relative pivoting of the parts from ther est position liffs the weights by increasing the angle between the ropes to provide an increasing restoring force tending to move the parts back to their rest positions.

17. A mooring structure according to claim 16, in which relative rotation of the parts of one head through a predetermined angle causes a greater restoring force than the same relative rotation of the parts of the other head.

18. In combination a mooring according to claim 1, and a nudging pontoon, the nudging pontoon having a portion shaped to accommodate the bows of a ship and at its opposite side having a portion shaped to accommodate the mooring, and projections on the ponton arranged to engage projections on respective rotatable parts of the mooring so as to cause relative rotation of the parts.

19. In combination a mooring structure according to claim 16 and a nudging pontoon, the nudging pontoon having a portion shaped to accommodate the bows of a ship and at its opposite side having a portion shaped to accommodate the mooring, and projections on the nudging pontoon arranged to engage the rotatable parts of a firs of the heads, and the rotatable parts of the other hea being arranged to receive mooring ropes from a ship t be moored.

20. A combination according to claim 19, in whic each rotatable part is formed with an outwardly extend ing arm arranged to be engaged by the projections o to be attached to a mooring rope respectively, the arm arranged to be engaged by the projections making greater angle with one another in their rest positions, thai the arms arranged to receive the mooring ropes.

21. A combination according to claim 20 in which th arms make an angle of approximately 120° with one an other, in their rest position, on the opposite side of th mooring from the pontoon.

22. In combination a mooring structure according t claim 1, and an annular variable buoyancy liquid storag tank, the tank having an aperture such as to accommodat the mooring.

23. A combination according to claim 22, in which th rotatable parts each have a radially extending arm t which a mooring rope from the tank is arranged to b attached, the arms in their rest positions being diametrical ly opposite to one another.

24. In combination a mooring structure according t claim 1 and a fender pivotally coupled to the mooing by link arms.

25. In combination a fender and a pair of moorin structures each according to claim 1, each mooring struc ture being pivotally coupled to one end of the fender by link arm, and each mooring structure including mean coupling its rotatable parts, whereby rotation of one o the parts causes rotation of the other part in the opposit direction.

26. In combination a mooring structure according t claim 1 and a fender having a frame shaped to span th mooring, the fender frame being engageable with th rotatable parts of the mooring, a further frame carried on the weight of the mooring to move vertically therewith, and links pivotally coupled between the frames, the arrangement being such that the fender can move towards and away from the mooring horizontally, movement towards the mooring serving to rotate the rotatable parts to lift the weight or weights and provide a restoring force.

References Cited

UNITED STATES PATENTS 3,120,106   2/1964   Foster ___________ 114—230 X
3,155,069   11/1964  Ross et al. _________ 114—230

MILTON BUCHLER, *Primary Examiner.*

T. M. BLIX, *Assistant Examiner.*